United States Patent [19]
Knechtges et al.

[11] 3,714,101
[45] Jan. 30, 1973

[54] HEAT SENSITIVE LATICES CONTAINING SILICONE POLYETHER

[75] Inventors: Donald P. Knechtges, Grafton, Ohio 44044; George J. Antlfinger, Avon Lake, Ohio 44012

[73] Assignee: The B. F. Goodrich Company, New York, N.Y.

[22] Filed: Oct. 21, 1970

[21] Appl. No.: 82,789

Related U.S. Application Data

[63] Continuation-in-part of Ser. No. 798,466, Feb. 11, 1969, abandoned.

[52] U.S. Cl..............260/29.6 RW, 117/161 KP, 117/161 UZ, 260/29.6 MN, 260/29.6 NR, 260/29.6 ME, 260/29.7 T, 260/29.7 E, 260/29.7 NQ
[51] Int. Cl..............................................C08f 45/24
[58] Field of Search....260/9.6 NR, 26.6 Z, 29.6 MQ, 260/29.7 T, 29.6 R, 29.6 MN

[56] References Cited

UNITED STATES PATENTS

| | | | |
|---|---|---|---|
| 3,344,103 | 9/1967 | Eilbeck et al. | 260/29.7 T |
| 3,484,394 | 12/1969 | Holdstock | 260/29.6 R |
| 3,483,240 | 12/1969 | Boudreau | 260/448.2 B |

*Primary Examiner*—Harold D. Anderson
*Attorney*—J. Hughes Powell, Jr.

[57] ABSTRACT

Synthetic latices are made heat-sensitive by the presence in the latex of a silicone polyether. The use of an organosulfonate in combination with a silicone polyether as a heat-sensitizing system for synthetic latices produces a heat-sensitive latex that is relatively stable at room temperature but that may be converted to a gel at a moderately low temperature and the silicone polyether may be used in significantly reduced amounts to impart heat-sensitivity to the latex as compared to the amounts of silicone polyether required as the heat-sensitizing additive without this additive. Organic acids when used in conjunction with the silicone polyether-sulfonate heat-sensitizing system, further enhance gelation of synthetic latices in that gelation occurs within a shorter time when the latex is heated to the gelation temperature, gelation of the latex occurs at a lower gelation temperature and gelation of latices with relatively low solids content can be accomplished.

10 Claims, No Drawings

HEAT SENSITIVE LATICES CONTAINING SILICONE POLYETHER

CROSS-REFERENCE TO RELATED APPLICATION

This is a continuation-in-part of our copending application Ser. No. 798,466 filed Feb. 11, 1969 now abandoned.

BACKGROUND OF THE INVENTION

It is known that some latices can be sensitized to heat by adding known heat-sensitizing compounds to latex. When heat is applied to such a latex the heat causes a phase inversion (often referred to as "gelation") to occur at a predetermined temperature. Unfortunately, many of the heat-sensitizing additives heretofore suggested render the latex objectionably unstable and even may cause gelation of the latex at room temperature if the latex is allowed to stand for too long a period of time without being used. Certain organo-polysiloxane latex heat-sensitizers do not appear to seriously destabilize the latex but must be present in large amounts in order to achieve the desired heat-sensitizing effect. Considering the high cost of such siloxane materials, the substantial amounts of these materials which must be used to impart the desired heat sensitivity to the latex has caused such sensitizers to be viewed as being economically impractical for many applications.

In our copending application, Ser. No. 82,790, filed Oct. 21, 1970, there is disclosed the use of silicone polyethers in combination with certain organosulfonate emulsifier compounds with a resulting significantly smaller amount of the silicone polyether required to impart the desired degree of heat-sensitivity to the latex. Decreased amounts of the silicone polyether may be used as compared to systems where the silicone polyether is used alone. The substantial reduction in the amount of the silicone polyether required to effect heat-sensitization of the latex when the silicone polyether is added to the latex with a sulfonate emulsifier compound permits the silicone polyethers to be used economically as commercial heat-sensitizers for synthetic latices. Improved results are obtained when the latex total solids is greater than 25 percent and the pH is less than 10.

SUMMARY OF THE INVENTION

It has now been found that the use of organic acids in these silicone polyether-organosulfonate systems substantially enhances the gelation characteristics of these sensitized latices. Thus, latices made sensitive to heat as hereinabove described with this system are made substantially more heat sensitive by the addition of organic acids. The organic acids are used in amounts from about one to five parts by weight per 100 weight parts of latex polymer solids resulting in improved viscosity, lowering the gelation temperature and, if desired, less of the required additives may be used and still obtain the same temperature and degree of gelation, and especially, allowing use of latices having lower total solids content than may be required in an efficient silicone polyetherorganosulfonate system.

DETAILED DESCRIPTION

The silicone polyethers useful as heat-sensitizers in accordance with this invention may be either soluble or unsoluble in water, although water-soluble silicone polyethers are more conveniently incorporated into the latex. Silicone polyethers having an inverse water solubility curve wherein the silicone polyether exhibits solubility in water at room temperature (25°C.) and water insolubility at a temperature moderately above room temperature are preferred. Silicone polyethers found to be particularly useful may be described as being a silicone-oxyalkylene block copolymer containing a butoxy-stopped ethylene-propylene glycol polymer attached to silicone atoms of methyl silicone through urethane linkages. A general formula for such silicone polyethers is:

[C$_4$H$_9$(OC$_n$H$_{2n}$)$_a$ OOCNH (CH$_2$)$_3$]$_b$ (CH$_3$)$_c$ SiO4-b-c/2 wherein $n$, $a$, $b$ and $c$ are integers, as described in U.S. Pat. Nos. 3,483,240 and 3,484,394.

The siloxane-oxyalkylene copolymer has the formula:

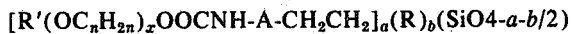
[R'(OC$_n$H$_{2n}$)$_x$OOCNH-A-CH$_2$CH$_2$]$_a$(R)$_b$(SiO4-a-b/2)

where R is an organic radical attached to silicon through a silicon-carbon linkage, R' is a member selected from the class consisting of lower alkyl radicals, e.g., alkyl radicals containing from one to seven carbon atoms, and aryl radicals; R is a divalent hydrocarbon radical containing no more than about seven carbon atoms; $a$ has a value of from 0.50 to 1.00, inclusive; $b$ has a value of from 1.12 to 1.90, inclusive; the sum of $a$ plus $b$ is equal to from 2.02 to 2.40, inclusive; $n$ has a value of from 2 to 4, inclusive; and $x$ has a value of at least 5, e.g., from 5 to 100 or more.

One of the preferred types of organohydrogenpolysiloxanes used in preparing the siloxane-oxyalkylene copolymers of the present invention are the triorganosilyl chain-stopped copolymers of diorganosiloxane units and organohydrogensiloxane units having the formula:

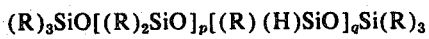
(R)$_3$SiO[(R)$_2$SiO]$_p$[(R)(H)SiO]$_q$Si(R)$_3$ where R is as previously defined, $q$ has an average value of from 0 to 45, inclusive, $q$ has a value at least as great as $p$ and from 3 to 48, inclusive, and the sum of $p$ plus $q$ is equal to from 3 to 48, inclusive, and where the sum of the silicon-bonded R groups plus the silicon-bonded hydrogen is equal to from 2.04 to 2.40 per silicon atom. In the preferred embodiment $p$ is 0 and all of the R groups are methyl.

Although from greater than 0.01 to 1.0 parts by weight of the silicone polyether per 100 parts by weight of latex solids may be used in accordance with this invention, for optimum commercial adaptibility from 0.1 to 0.5 part by weight of the silicone polyether per 100 parts by weight of latex solids is preferred.

The organo-sulfonate emulsifier compounds to be combined with the silicone polyether in accordance with this invention are water-soluble compounds having at least one sulfonate group attached to an aromatic ring and are represented by the formula

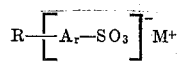
R—[A$_r$—SO$_3$]$^-$ M$^+$ wherein R contains eight to 20 carbon atoms as butyl, octyl, decyl, dodecyl and the like, alkyl or alkenyl radicals and combinations of said radicals with ethoxy chains, a phenyl radical (such as radicals represented by the structures

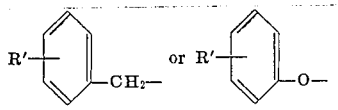

where R' is hydrogen, an aliphatic radical containing one to 16 carbon atoms as butyl, octyl, decyl, dodecyl and like alkyl or alkenyl radicals or an aryl radical having the structure

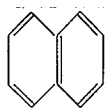

A is the benzene ring

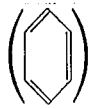

or the naphthalene ring

, and M is an alkali metal as sodium or potassium or $NH_4$. Greater than about four parts by weight of such organosulfonate compound per 100 parts by weight of latex solids should be used in combination with the silicone polyether to obtain the desired heat-sensitization. In commercial applications, normally no more than about 10 to 15 parts by weight of such organo-sulfonate emulsifier compound per 100 parts by weight of latex solids would be used even though the addition of greater amounts of the organo-sulfonate compound does not appear to decrease the effectiveness of the heat-sensitization. For practical considerations about four to ten total parts by weight of such organo-sulfonate emulsifier per 100 parts by weight of latex solids is preferred. Although the reason why a lesser amount of the silicone polyether is required when used in this combination to effect heat-sensitization is not fully understood, it is believed a complex is formed and when the latex is heated this interacts with or removes the protective soap from the latex particles to bring about the desired gelation.

Useful organic acids should have sufficient water-solubility so that at least about 1 weight part per 100 weight parts of polymer is dissolved in the latex. Acids having a solubility of at least one gram in 100 grams of water at 25°C. normally may be used. Such carboxylic acids include acids having two to 12 carbon atoms. Aliphatic dicarboxylic acids and hydroxy-carboxylic acids containing about three to 10 carbon atoms such as citric, lactic, glycollic, malic, maleic, malonic, adipic and succinic acid, for example, are useful. Tartaric acid and oxalic acid have been found to be unexpectedly superior in enhancing the gelation properties of heat sensitive latices. While strong acids such as acetic acid may be used, care must be taken in some systems so as not to coagulate the latex. The organic acids include polycarboxylic acids including, for example, polyacrylic acid and water-soluble copolymers thereof containing more than 10 percent carboxylic acid. Such polyacrylic acids have molecular weights ranging from about 50,000 to 250,000 and higher. A preferred group of organic acids include hydroxy-carboxylic acid and di-carboxylic acids containing 3 to eight carbon atoms and polyacrylic acid having a solubility in water of at least 1 percent, preferably greater than 5 percent, at room temperature added in amounts of about one to five weight parts per 100 weight parts of latex polymer solids. Substantially larger amounts do not result in any further increase in sensitivity. It has been found that 10 weight parts of oxalic acid results in very little increase in heat sensitivity in a silicone polyether-organosulfonate system.

The combination of the silicone polyethers and sulfonate compounds hereinabove described may be employed for sensitizing film-forming synthetic latices of vinylidene monomers containing at least one terminal

group, such as aqueous dispersions of rubbery polymers of open-chain conjugated diolefins having from four to eight carbon atoms exemplified by butadiene-1,3; isoprene, and the like, rubbery copolymers of these and similar conjugated diolefins with each other in amounts more than 50 percent or with at least 1 percent of copolymerizable monomeric materials containing a single

group; such as the styrenes, α-methyl styrene, alkyl acrylates as methyl acrylate, ethyl acrylate, methyl methacrylate, ethyl methacrylate, the nitriles as acrylonitrile and methacrylonitrile, acrylic and methacrylic acids, itaconic acid, vinyl ketones, vinyl ethers, vinyl esters, vinyl pyridine; and the like, polymers of alkyl acrylates wherein the alkyl group contains 1–10 carbon atoms and copolymers thereof with other vinylidene monomers; copolymers of more than 50 percent vinylidene chloride and more than 5 percent alkyl acrylate and the like. Such polymers and others are described for example in Vinyl and Related Polymers, Schildknecht (Wiley). Various emulsion polymerization processes are well known in the art such as those processes described in Whitby, "Synthetic Rubber" (John Wiley & Sons, 1954).

The total solids of the latices treated as described may be varied quite widely but should contain greater than about 25 to about 75 weight percent total solids of polymer and more preferably from about 30 to about 65 weight percent. The pH of the latex has some effect on the temperature of gelation. Generally gelling occurs at the lowest temperature at the lowest pH consistent with a stable latex. A pH below 10, and preferably below about 9 is usually maintained. Gelation temperature may be controlled from room temperature 25°C. to about 100°C.

The organosulfonate silicone polyether and acid are added to the latex before, during or after the latex has been compounded in any order. Usually the acid is added after the organo-sulfonate. While, as the Examples show, the defined organo-sulfonates have been used as emulsifiers in polymerization reactions, it is not believed that any commercial latices are made with as much as six weight parts of emulsifier per 100 weight parts of monomers. Therefore, in order to meet the requirements of this invention so that at least about four weight parts of the organo-sulfonate be used along with less than one part of the silicone polyether, one normally adds additional organo-sulfonate. Of course, if the polymerization is conducted with one of the many other known protective agents other than the defined organo-sulfonates, it will be necessary to add about four weight parts of the organo-sulfonate in order to achieve the advantages of this invention. The organo-sulfonate may be intermixed with the silicone polyether and this added as a mixture to the latex.

The following examples illustrate suitable methods of carrying out the present invention. However, it is understood that the examples are primarily illustrative and are not to be construed to limit the scope of invention.

In the examples, gel temperatures were determined by the following method. A latex is compounded having additives thereto as indicated. Fifteen milliliters of the compounded latex are placed into a 50 ml. test tube and said test tube is thereafter placed into a boiling hot water bath. A thermometer is placed inside the test tube for the purpose of recording the latex temperature and for the purpose of constantly stirring the latex. Upon gelation of the latex, the gel temperature is recorded.

EXAMPLE I

A synthetic latex was prepared from a monomer mixture of 53 parts (wt.) butadiene, 20 parts (wt.) acrylonitrile, 25 parts (wt.) styrene, 1 part (wt.) methacrylic acid, and 1 part (wt.) N-methylol acrylamide (wt.) in accordance with Example I of U.S. Pat. No. 3,344,103, and having a total polymer solids concentration of about 50 percent (wt.) and about 2 parts (wt.) of sulfonate emulsifier.

EXAMPLE II

The latex of Example I was sensitized by adding emulsifiers, silicone polyether (SF-1138) and organic acids as indicated below. Additions are parts by weight per 100 parts (wt.) of latex polymer solids.

| Emulsifier + Organic Acids | Silicone Polyether | Gel Temp. |
|---|---|---|
| a) Add —0— | 0.1 | Coag. |
| b) 5.0 Santomerse S | 0.1 | 49°C. |
| c) 4.0 Lomar PW + 5.0 Santomerse S | 0.5 | 39°C. |
| d) 4.0 Santomerse S + 1.0 polyacrylic acid (molecular weight 90,000) | 0.2 | 32°C. |
| e) 4.0 Santomerse S + 1.0 ammonium polyacrylate (molecular weight 90,000) | 0.2 | 34°C. |
| f) 4.0 Santomerse S + 1.0 polyacrylic acid (molecular weight 200,000 – 250,000) | 0.2 | 35°C. |
| g) 4.0 Santomerse S + 1.0 Tartaric Acid | 0.2 | 32°C. |
| h) 4.0 Santomerse S + 1.0 ammonium polyacrylate (molecular weight 180,000) | 0.2 | 40°C. |

EXAMPLE III

A synthetic latex was prepared from a monomer mixture of about 52 parts (wt.) butadiene, 45 parts (wt.) styrene, and 3 parts (wt.) acrylic acid and interpolymerized in the presence of about 0.2 parts (wt.) potassium persulfate and about 0.5 part (wt.) tertiary C-12 mercaptan, and having about 3.0 part (wt.) sulfonate AA-10 at 50°C. The latex had a total polymer solids concentration of about 50 percent (wt.).

EXAMPLE IV

The latex of Example III was sensitized by adding emulsifiers, silicone polyether (SF-1138) and organic acids as indicated below. Additions are parts by weight per 100 parts (wt.) of latex polymer solids.

| Emulsifier + Organic Acids | Silicone Polyether | Gel Temp. |
|---|---|---|
| a) Add —O— | 0.5 | 90°C. |
| b) 2.0 Tartaric Acid | 0.5 | 92°C. |
| c) 4.0 Santomerse S | 0.5 | 58°C. |
| d) 4.0 Santomerse S + 2.0 Tartaric Acid | 0.5 | 49°C. |

EXAMPLE V

A synthetic latex was prepared from about 100 parts (wt.) ethyl acrylate polymerized in water in the presence of about 0.5 part (wt.) of tetrasodium pyrophosphate and about 0.3 part (wt.) potassium persulfate. Latex had a total polymer solids content of about 50 percent (wt.).

EXAMPLE VI

The latex of Example V was sensitized by adding emulsifiers, silicone polyether (SF-1138) and organic acids as indicated below. Additions are parts by weight per 100 parts (wt.) of latex polymer solids.

| Emulsifier + Organic Acids | Silicone Polyether | Gel Temp. |
|---|---|---|
| a) Add —O— | 0.5 | 80°C. |
| b) 3.0 Santomerse S + 1.0 Lomar PW + 1.0 Tartaric Acid | 0.5 | 45°C. |

EXAMPLE VII

A synthetic latex being a copolymer of a major proportion of vinyl chloride with methyl acrylate and containing about 1 part (wt.) Santomerse S per 100 parts (wt.) latex polymer solids, was modified with about 35 parts (wt.) alkyl aryl phosphate plasticizer (Santicizer 141).

EXAMPLE VIII

The latex of Example VII was sensitized by adding emulsifiers, silicone polyether (SF-1138) and organic acids as indicated below. Additions are parts by weight per 100 parts (wt.) of latex polymer solids.

| Emulsifier + Organic Acids | Silicone Polyether | Gel Temp. |
| --- | --- | --- |
| a) Add —O— | 2 | 94°C. |
| b) 4.0 Santomerse S + Lomar PW | 0.5 | 85°C. |
| c) 4.0 Santomerse S + Lomar PW + 3.0 Tartaric Acid | 0.5 | 55°C. |
| d) 4.0 Santomerse S + 3.0 Tartaric Acid | 0.5 | 56°C. |
| e) 4.0 Santomerse S + 3.0 Oxalic Acid | 0.5 | 58°C. |
| f) 4.0 Santomerse S + 3.0 Citric Acid | 0.5 | 68°C. |
| g) 4.0 Santomerse S + 3.0 Malic Acid | 0.5 | 70°C. |
| h) 4.0 Santomerse S + 3.0 Malonic Acid | 0.5 | 70°C. |
| i) 4.0 Abex 18S (Non-sulfonate) + 3.0 Tartaric Acid | 0.5 | No gel |
| j) 4.0 Aerosol OT (Non-Sulfonate) +3.0 Tartaric Acid | 0.5 | No gel |

Further advantages are realized by the addition of certain organic acids. Latices having a reduction in latex polymer solids generally necessitate a higher gelation temperature. However, addition of certain organic acids enables a considerable lowering of the gelation temperature. Reference is made to Example IX illustrating effectiveness of organic acid additions in promoting gelation of low polymer solids latices.

EXAMPLE IX

The latex of Example I having varying amounts of water added was sensitized with emulsifier and silicone polyether (SF-1138). The effectiveness of organic acids in enhancing the gelation characteristics of low solids latices is apparent. Additions indicated are parts by weight per 100 parts (wt.) latex polymer solids.

| Emulsifier + Organic Acids | Silicone Polyether | Gel Temp. |
| --- | --- | --- |
| a) Add 4.0 Santomerse S (36% total latex (solids) | 0.1 | 91°C. |
| b) Add 4.0 Santomerse S + 1.0 Citric Acid (35% total latex solids) | 0.1 | 65°C. |

Although specific embodiments of preferred compositions have been hereinbefore described, it is understood that obvious variations and modifications of the recited examples and those discernible by one skilled in the art are contemplated and are included within the spirit and scope of this invention as defined in the appended claims.

We claim:

1. A heat sensitive latex of a film-forming polymeric synthetic latex consisting essentially of vinylidene monomers having at least one terminal

group, containing (1) a water soluble organosulfonate emulsifier having at least one aromatic ring and at least one —SO$_3$ group attached thereto of the formula

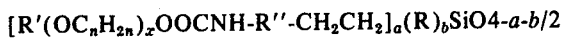

wherein R is alkyl or alkenyl containing eight to 20 carbon atoms, or aryl, A$_r$ is phenyl or naphthyl and M is an alkali metal, present in said latex in amounts of at least about five parts to less than about 20 parts by weight per 100 parts by weight of film-forming polymer, and (2) about 0.05 to less than one weight part per 100 weight parts of film-forming polymer of a liquid silicone polyether of the formula

[R'(OC$_n$H$_{2n}$)$_x$OOCNH-R''-CH$_2$CH$_2$]$_a$(R)$_b$SiO4-a-b/2 wherein R is an organic radical attached to silicon through a silicon-carbon linkage, R' is a member selected from the class consisting of lower alkyl radicals containing from one to seven carbon atoms, and aryl radicals; R'' is a divalent hydrocarbon radical containing no more than about seven carbon atoms; $a$ has a value of from 0.50 to 1.00, inclusive; $b$ has a value of from 1.12 to 1.90, inclusive; the sum of $a$ plus $b$ is equal to from 2.02 to 2.40, inclusive; $n$ has a value of from 2 to 4, inclusive; and $x$ has a value of at least 5 to 100; at least one to 5 weight parts per 100 weight parts of film forming polymer of an organic acid selected from the group consisting of aliphatic carboxylic acids containing two to 12 carbon atoms and polyacrylic acid, said organic acids having a water solubility of at least one gram in 100 grams of water.

2. The heat sensitive latex of claim 1 wherein in the organosulfonate, R is a radical of the structure

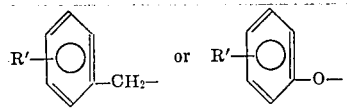

where R' is hydrogen, alkyl having from one to 16 carbon atoms, or an aryl radical having the structure A is the benzene ring

or naphthalene ring

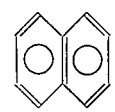

M is sodium or potassium and the silicone polyether is a silicone-oxyalkylene block copolymer containing a butoxy-stopped ethylene-propylene glycol polymer attached to silicone atoms of methylsilicone through urethane linkages wherein the organic acid is selected from the group consisting of aliphatic dicarboxylic acids and hydroxycarboxylic acids containing about three to 10 carbon atoms and polyacrylic acid having a molecular weight of about 50,000 to 250,000 in amounts of about one to five weight parts per 100 weight parts of film forming polymer.

3. The heat sensitive latex of claim 2 wherein the latex contains a polymer containing a more than 50 percent butadiene-1,3.

4. The heat sensitive latex of claim 2 wherein the polymer of the synthetic latex is a polymer containing a major proportion of an alkyl acrylate wherein the alkyl group contains two to eight carbon atoms.

5. The heat sensitive latex of claim 2 wherein the organo-sulfonate emulsifier is selected from the group consisting of (a) 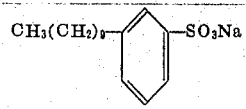

(b) 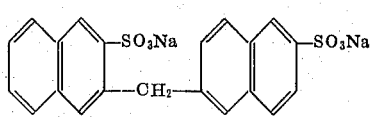

(c) 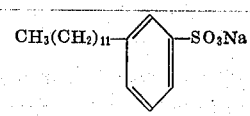

(d) 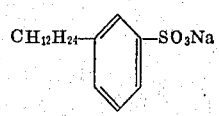

(e) 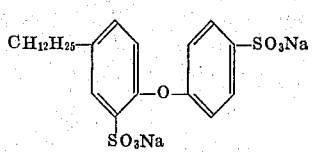

6. The heat sensitive latex of claim 5 wherein the polymer contains at least about 50 percent butadiene-1,3 and greater than 1 percent of at least one other vinylidene monomer containing a single terminal

grouping.

7. The heat sensitive latex of claim 5 wherein the alkyl acrylate polymer contains greater than 50 percent alkyl acrylate and at least 1 percent of at least one other vinylidene monomer containing a single terminal

group.

8. A heat sensitive latex of claim 2 wherein the polymer is a copolymer of butadiene-1,3 containing greater than 50 percent butadiene-1,3 and at least 1 percent of an acrylic acid of N-alkylol acrylamide and the organo-sulfonate has the formula

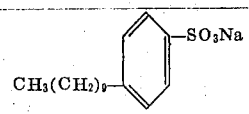

and the organic acid is oxalic acid, tartaric acid, polyacrylic acid or ammonium polyacrylate.

9. A heat sensitive latex of claim 2 wherein the polymer is a copolymer of an alkyl acrylate containing greater than 50 percent alkyl acrylate and at least 1 percent of an acrylic acid or N-alkylol acrylamide and the organo-sulfonate has the formula

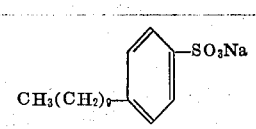

and the organic acid is oxalic acid, tartaric acid, polyacrylic acid or ammonium polyacrylate.

10. The heat sensitive latex of claim 2 wherein the amount of organo-sulfonate present is from about six to about 10 weight parts.

* * * * *